US012591193B2

(12) United States Patent
Oguri et al.

(10) Patent No.: US 12,591,193 B2
(45) Date of Patent: Mar. 31, 2026

(54) FIXING DEVICE INCLUDING FIRST AND SECOND HEATING MEMBERS DISPOSED AT DIFFERENT LOCATIONS ALONG A TRAVELING DIRECTION OF A RECORDING MATERIAL

(71) Applicant: CANON KABUSHIKI KAISHA, Tokyo (JP)

(72) Inventors: Hiroshi Oguri, Chiba (JP); Takashi Uehara, Chiba (JP); Satoshi Takemoto, Ibaraki (JP); Akitomo Miyamoto, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/630,114

(22) Filed: Apr. 9, 2024

(65) Prior Publication Data

US 2024/0385557 A1 Nov. 21, 2024

(30) Foreign Application Priority Data

May 17, 2023 (JP) ................................ 2023-081487

(51) Int. Cl.
*G03G 15/20* (2006.01)

(52) U.S. Cl.
CPC ..... *G03G 15/2053* (2013.01); *G03G 15/2064* (2013.01); *G03G 2215/2016* (2013.01)

(58) Field of Classification Search
USPC ........................................................ 399/329
See application file for complete search history.

(56) References Cited

U.S. PATENT DOCUMENTS

2017/0255147 A1* 9/2017 Seki .................. G03G 15/2053

FOREIGN PATENT DOCUMENTS

JP 2021096469 A 6/2021

* cited by examiner

*Primary Examiner* — Quana Grainger
(74) *Attorney, Agent, or Firm* — ROSSI, KIMMS & McDOWELL LLP

(57) ABSTRACT

Disclosed is a fixing device which has a heater that includes a circuit board, a first heating member provided on the circuit board, and a second heating member to heat a region different from that of the first heating member in a longitudinal direction of the circuit board, and a pressurizing rotating member that fixes a toner image to a recording material by applying heat and pressure to the recoding material at a nip together with a fixing belt, wherein the first heating member is disposed inside the nip in a widthwise direction perpendicular to the longitudinal direction, wherein the second heating member is disposed outside the nip in the widthwise direction, and wherein an amount of generating heat per a unit length of the second heating member is larger than that of the first heating member.

13 Claims, 6 Drawing Sheets

FIXING DEVICE INCLUDING FIRST AND SECOND HEATING MEMBERS DISPOSED AT DIFFERENT LOCATIONS ALONG A TRAVELING DIRECTION OF A RECORDING MATERIAL

BACKGROUND OF THE INVENTION

Field of the Invention

This invention relates to a fixing device that fixes a toner image on a recording material to the recording material.

Description of the Related Art

Conventionally, in an image forming apparatus such as an electrophotographic apparatus and an electrostatic recording apparatus, an unfixed toner image is formed on a sheet-like recording material and the toner image formed on the recording material is fixed by means of heating and pressurizing by a fixing device.

A fixing device with a ceramic heater as heating means has been conventionally known. Such fixing device has a quick-start (on-demand) property and adopts a fixing belt heating system of an energy-saving type for reducing power consumption by minimizing the power supply to the fixing device during the standby period of an image forming apparatus.

A fixing device of the fixing belt heating system forms a fixing nip portion by interposing a fixing belt between a ceramic heater and a pressurizing roller as pressurizing member. A recording material which bears an unfixed toner image is nipped and conveyed at the fixing nip portion, so that the unfixed toner image is fixed onto the recording material with heat and pressure. Further, in a fixing device of the fixing belt heating system, the ceramic heater and the fixing belt are pressed to each other to form a fixing belt nip.

Recently, it is required for an image forming apparatus to reduce time for warm-up by means of a rapid increase in temperature and to support various sizes of the recording materials. To reduce time for warm-up, it could be considered to decrease the heat capacity of the fixing heater. In general, there are different sizes of sheets (standard-sizes of sheets) according to purposes in forming an image in an image forming apparatus and sheet passing portions in the fixing device differ depending on the standard-sizes of the sheets.

However, when the heat capacity is decreased, if only a heating member with a length adapted to the maximal width of recording materials is used, the temperature of a non-sheet-passing region through which recording materials do not pass becomes too high as compared with that of a sheet-passing region through which recording materials pass (which is referred to as “an edge temperature rise”). Further, to meet the demand for support of various sizes of recording materials, a heating member with a length adapted to the maximum width of the recording materials to be used in the image forming apparatus should be provided. However, only a limited temperature control is possible when using only a heating member with a length adapted to the maximum width of the recording materials.

Under these circumstances, Japanese Patent Application Publication No. 2021-96469 discloses an image forming apparatus with divided heaters having heating regions which can be independently controlled in conformity with widths of recording materials. In the image forming apparatus of Japanese Patent Application Publication No. 2021-96469, multiple heating members with lengths, different each other in the longitudinal direction are disposed in parallel in the widthwise direction. The image forming apparatus of Japanese Patent Application Publication No. 2021-96469 turns on appropriate heating regions of the heating members in conformity with the recording materials. This enables to reduce the heating regions in the non-sheet-passing region, so that the edge temperature rise can be suppressed and various recording materials can be used.

However, in the image forming apparatus of Japanese Patent Application Japanese Patent Publication No. 2021-96469, the heating members disposed outside the fixing belt nip are distant from the film, so that the heat transmission efficiency becomes low.

In contrast to this, when all the multiple heating members are disposed inside the fixing belt nip, the heat of the heating members can be efficiently transmitted to a recording material. However, it is not realistic to configure the fixing belt nip with an enough with for all the multiple heating members to be disposed inside the fixing belt nip from the viewpoints of separation property when a recording material passes through the fixing belt nip, an image fixing property, and a film life length. Therefore, in the image forming apparatus of Japanese Patent Publication No. 2021-96469, the width of the fixing belt nip has to be a limited value, so that the problem of lowering of the efficiency of the heat transmission from the heating members outside the fixing belt nip to the film cannot be resolved.

SUMMARY OF THE INVENTION

The purpose of the present invention is to provide a fixing device that can suppress the lowering of the efficiency of the heat transmission to the film from the heating members disposed outside the fixing belt nip out of multiple heating members provided in the fixing heater.

A fixing device according to the present invention, comprising:

- a fixing belt that is endless and configured to apply heat to a recording material;
- a heater configured to apply heat to the fixing belt, the heater being contact with an inner surface of the fixing belt;
- a pressurizing rotating member configured to form a nip together with the heater via the fixing belt, the pressurizing rotating member being contact with an outer surface of the fixing belt,
- wherein the heater includes a circuit board, a first heating member provided on the circuit board, and a second heating member configured to heat a region different from that of the first heating member in the longitudinal direction of the circuit board,
- wherein the pressurizing rotating member fixes a toner image to the recording material by applying heat and pressure to the recoding material at the nip together with the fixing belt,
- wherein the first heating member is disposed inside the nip in a widthwise direction perpendicular to the longitudinal direction,
- wherein the second heating member is disposed outside the nip in the widthwise direction, and
- wherein an amount of generating heat per a unit length of the second heating member is larger than that of the first heating member.

Further features of the present invention will become apparent from the following description of exemplary embodiments with reference to the attached drawings.

DESCRIPTION OF THE EMBODIMENTS

Figure 1:
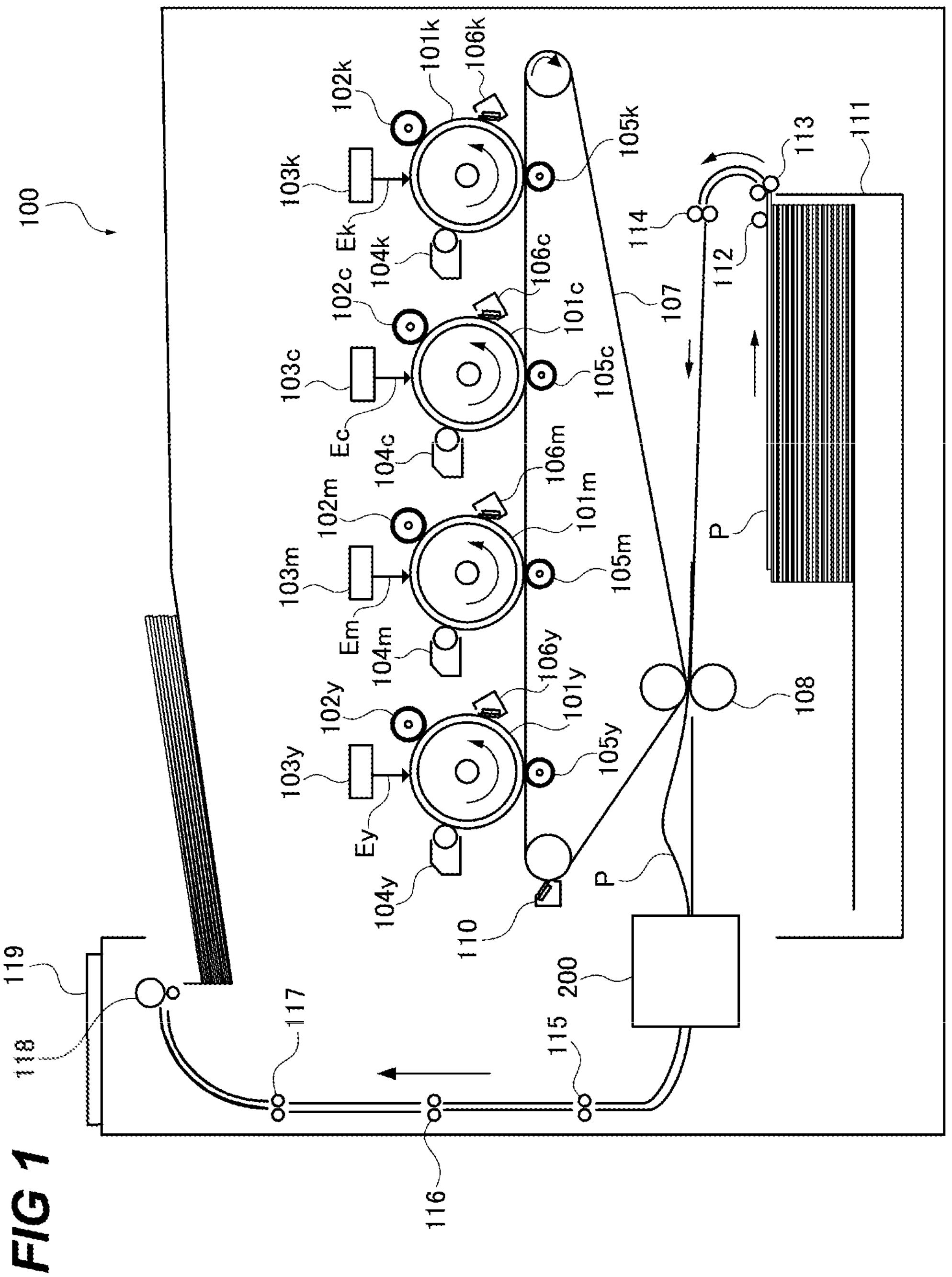
FIG. 1 is a schematic diagram showing the configuration of an image forming apparatus according to an embodiment of the present invention.

Hereinafter, with reference to the drawings, embodiments of the present invention will be described in detail.

<Configuration of Image Forming Apparatus>

The configuration of the image forming apparatus 100 according to an embodiment of the present invention will be described referring to FIG. 1.

The image forming apparatus 100 has the photosensitive drums 101*y*, 101*m*, 101*c*, and 101*k*, the charging rollers 102*y*, 102*m*, 102*c*, and 102*k*, the exposure devices 103*y*, 103*m*, 103*c*, and 103*k*, the developing devices 104*y*, 104*m*, 104*c*, and 104*k*, the primary transfer rollers 105*y*, 105*m*, 105*c*, and 105*k*, the photosensitive member cleaner 106*y*, 106*m*, 106*c*, and 106*k*, and the intermediate transfer belt 107.

The image forming apparatus 100 also has the secondary transfer roller 108, the intermediate transfer belt cleaner 110, the sheet-feeding cassette 111, the pick-up roller 112, the sheet-feeding rollers 113, the registration rollers 114, the conveying rollers 115, 116, 117, and 118, the operation portion 119, and the fixing device 200.

The photosensitive drum 101*y*, the charging roller 102*y*, the exposure device 103*y*, the developing device 104*y*, the primary transfer roller 105*y*, and the photosensitive member cleaner 106*y* are provided at the first image forming station y where yellow images are formed. The photosensitive drum 101*m*, the charging roller 102*m*, the exposure device 103*m*, the developing device 104*m*, the primary transfer roller 105*m*, and the photosensitive member cleaner 106*m* are provided at the second image forming station m where magenta images are formed.

The photosensitive drum 101*c*, the charging roller 102*c*, the exposure device 103*c*, the developing device 104*c*, the primary transfer roller 105*c*, and photosensitive member cleaner 106*c* are provided in the third image forming station c, which cyan images are formed. The photosensitive drum 101*k*, the charging roller 102*k*, the exposure device 103*k*, the developing device 104*k*, the primary transfer roller 105*k*, and the photosensitive member cleaner 106*k* are provided at the fourth image forming station k, where black images are formed. The image forming portion is constituted by the image forming station y, the image forming station m, the image forming station c and the image forming station k.

The photosensitive drums 101*y*, 101*m*, 101*c*, and 101*k* are driven by a driving device (not shown) controlled by a CPU (not shown), to rotate in the direction of the arrow in FIG. 1 at a predetermined process speed. Image forming instructions are input to this CPU from the operation portion 119 or from a network.

The charging rollers 102*y*, 102*m*, 102*c*, and 102*k* uniformly charge the rotationally driven photosensitive drums 101*y*, 101*m*, 101*c*, and 101*k* to a predetermined polarity and potential.

Image signals are input to the exposure devices 103*y*, 103*m*, 103*c*, and 103*k* from the CPU, which receives image forming instructions from the operation portion 119 or from the network. The exposure devices 103*y*, 103*m*, 103*c*, and 103*k* irradiate with the laser beams Ey, Em, Ec, and Ek the photosensitive drums 101*y*, 101*m*, 101*c*, and 101*k* uniformly charged to a predetermined polarity and potential according to the input image signal to form electrostatic latent images.

The developing devices 104*y*, 104*m*, 104*c*, and 104*k* are driven to rotate by a drive device under the control of the CPU at a predetermined process speed in the direction of the arrow shown in FIG. 1. The developing devices 104*y*, 104*m*, 104*c*, and 104*k* form toner images on the photosensitive drums 101*y*, 101*m*, 101*c*, 101*k* by developing the electrostatic latent images formed on the photosensitive drums 101*y*, 101*m*, 101*c*, and 101*k* with toner at the developing position.

The primary transfer rollers 105*y*, 105*m*, 105*c*, and 105*k* respectively transfer the toner images formed on the photosensitive drums 101*y*, 101*m*, 101*c*, and 101*k* onto the intermediate transfer belt 107 in a superimposing manner.

The photosensitive member cleaners 106*y*, 106*m*, 106*c*, and 106*k* respectively scrape off and collect residual toner from the photosensitive drums 101*y*, 101*m*, 101*c*, and 101*k*.

The intermediate transfer belt 107 conveys to the secondary transfer roller 108 the four-color toner images transferred from the photosensitive drums 101*y*, 101*m*, 101*c*, and 101*k* by the primary transfer rollers 105*y*, 105*m*, 105*c*, and 105*k*.

The secondary transfer roller 108 is driven to rotate by a drive device under the control of the CPU at a predetermined process speed in the direction of the arrow shown in FIG. 1. The secondary transfer roller 108 transfers in one batch the four-color toner images conveyed by the intermediate transfer belt 107 onto the surface of the recording material P conveyed by the registration roller 114 by applying a voltage from a high-voltage circuit board (not shown). The secondary transfer roller 108 conveys the recording material P on which the four-color toner images are transferred in one batch to the fixing device 200.

The intermediate transfer belt cleaner 110 scrapes off and collects residual toner from the intermediate transfer belt 107.

The sheet-feeding cassette 111 accommodates the recording materials P.

The pickup roller 112 feeds the recording materials P accommodated in the sheet-feeding cassette 111 to the sheet feeding rollers 113 at a predetermined timing.

The sheet feeding rollers 113 are provided to prevent multi-feeding of recording materials P. The sheet feeding rollers 113 separate the recording materials P fed by the pickup roller 112 one sheet at a time and feeds it to the registration rollers 114.

The registration rollers 114 are provided to prevent the skewing of the recording material P. The registration roller 114 conveys the recording material P fed by the sheet feeding roller 113 to the secondary transfer roller 108 in accordance with the timing when the four-color toner image conveyed by the intermediate transfer belt 107 passes the secondary transfer roller 108.

The conveying rollers 115 convey the recording material P conveyed by the fixing device 200 to the conveying rollers 116.

The conveying rollers 116 convey the recording material P conveyed by the conveying rollers 115 to the conveying rollers 117.

The conveying rollers 117 convey the recording material P conveyed by the conveying rollers 116 to the conveying rollers 118.

The conveying rollers 118 discharge the recording material P conveyed by the conveying rollers 117 outside the image forming apparatus 100. As a result, the recording material P on which a color image is formed is available.

The operation portion 119 outputs the instructions for forming an image on the recording material P input by user operation, to the CPU (not shown).

The fixing device 200 fixes the toner image on the recording material P by heating and pressurizing the recording material P on which the toner image has been transferred by the secondary transfer roller 108 and conveyed to the fixing device 200. The fixing device 200 conveys the recording material P on which the toner image has been fixed to the conveying rollers 115.

<Configuration of Fixing Device>

The configuration of the fixing device 200 according to an embodiment of the present invention will be described in detail with reference to FIGS. 2 to 4.

The fixing device 200 has the fixing heater unit 201, the pressurizing roller 202, the temperature detection portion 211, the thermostat 212, the alternating current voltage source 401, the switches 402 and 403, the power control portions 404*a*, 404*b*, 404*c*, and 404*d*, and the heater control portion 406.

The fixing heater unit 201 nips and conveys the recording material P together with the pressurizing roller 202 to fix the toner image formed on the recording material P to the recording material P. The fixing heater unit 201 has the fixing heater 203, the heater holder 204, the reinforcing metal plate 205, and the fixing belt 206.

The fixing heater 203 is a heat source, which is, for example, a ceramic heater. The fixing heater 203 extends in the longitudinal direction perpendicular to the conveying direction of the recording material P (perpendicular to the sheet surface of FIG. 2 and from left to right in FIG. 3). The fixing heater 203 is fixed to and supported by the heater holder 204. The fixing heater 203 contacts the inner circumference of the fixing belt 206 to form the fixing belt nip F. Further, the fixing heater 203 transmits heat to the fixing belt 206. The configuration of the fixing heater 203 will be described later in detail.

The inner surface of the fixing belt 206 contacts with the fixing heater 203 at the fixing belt nip F. The contact width between the fixing belt 206 and the fixing heater 203 is limited due to the shape of the heater holder 204, so that the fixing belt nip F is narrower than the width of the heater 203 in the widthwise direction (left to right in FIGS. 2B and 3). Further, the fixing belt nip F is shorter than the fixing nip portion N in the widthwise direction of the fixing heater 203 (see FIG. 2B).

The heater holder 204 has a semi-circular arc tub shape in cross section and supports the fixing heater 203. The heater holder 204 serves to hold the fixing heater 203 and also guides the rotation of the fixing belt 206. Both end portions of the heater holder 204 in the longitudinal direction are urged toward the pressurizing roller 202 with a force of 90 to 320 [N] by a pressurizing mechanism (not shown), so that the bottom surface of the fixing heater 203 is pressurized by the heater holder 204 on the pressurizing roller at a predetermined pressurizing force against the elastic force of the elastic layer of the pressurizing roller 202 via the fixing belt 206. The bottom surface of the fixing heater 203 is the surface opposite the heating surface of the fixing heater 203. The heater holder 204 forms a fixing nip portion N with a predetermined width necessary for fixing by pressurizing the bottom surface of the fixing heater 203 against the pressurizing roller 202 via the fixing belt 206. The fixing nip portion N is formed by the fixing heater 203 and the pressurizing roller 202 via the fixing belt 206 while the outer circumference of the fixing belt 206 contacts the pressurizing roller 202.

The reinforcing sheet metal 205 is of a shape of an inverted U and is provided such that the fixing heater unit 201 is not deformed when pressurized by the pressurizing roller 202.

The fixing belt 206 is endless and cylindrical. The fixing belt 206 has a base material made of cylindrical stainless steel of 30 [μm] thickness and a silicone rubber layer (elastic layer) with approximately 300 [μm] thickness formed on base material by the ring coating method. On the silicone rubber layer, a 20 [μm] thick PFA (tetrafluoroethylene perfluoroalkyl vinyl ether copolymer) resin tube is coated as the top surface layer of the fixing belt 206. Grease is applied to the inner surface of the fixing belt 206 to improve sliding property between the heater holder 204 and the inner surface of the fixing belt 206.

The base material of the fixing belt 206 is not limited to stainless steel, but may also be a nickel-based metallic material or a heat-resistant resin such as polyimide. When the base material is formed by a heat-resistant resin such as polyimide, it is not necessary to provide a polyimide layer as a sliding layer on the fixing heater 203.

The fixing belt 206 is driven to rotate by the rotation of the pressurizing roller 202. The fixing belt 206 slides in close contact with the surface of the circuit board 207 of the fixing heater 203 and rotates in a predetermined direction (clockwise direction in FIG. 2) around the heater holder 204 as the pressurizing roller 202 is driven to rotate. The fixing belt 206 applies heat to the recording material P.

The pressurizing roller 202 as a pressurizing rotating member is located below the fixing heater unit 201. The pressurizing roller 202 is a multilayered pressurizing member having the silicone rubber layer 213 about 3 [mm] thick and the PFA resin tube 214 about 40 [μm] thick in this order on the stainless steel core 210.

Figure 2A:
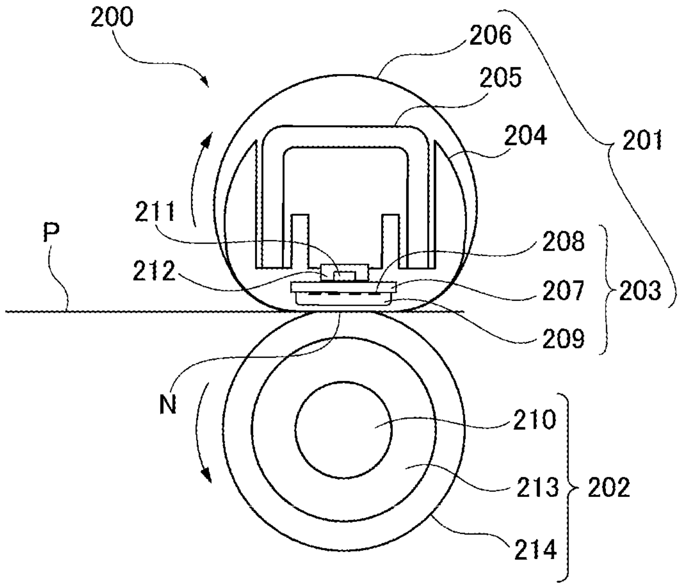
FIGS. 2A and 2B are schematic diagrams showing sectional views of the configuration of a fixing device according to an embodiment of the present invention.
Figure 2B:
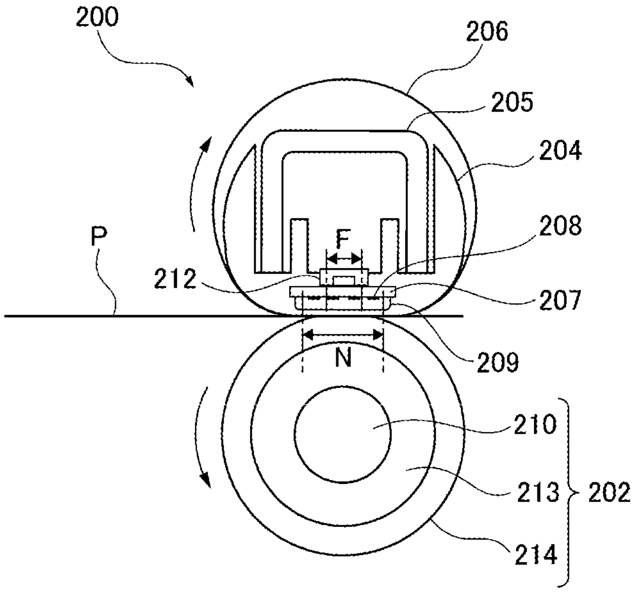

The pressurizing roller 202 is driven to rotate in a predetermined direction (counterclockwise direction in FIG. 2) by a drive system (not shown) to convey the recording material P in the conveying direction (leftward direction in FIG. 2). The pressurizing roller 202 nips and conveys the recording material P together with the fixing belt 206 of the fixing heater unit 201 at the fixing nip portion N to fix the toner image formed on the recording material P by applying heat and pressure to the recording material P.

The temperature detection portion 211 is located on the top surface of the fixing heater 203, which is the heating surface of the fixing heater 203. The temperature detection portion 211 has a temperature detection sensor that detects the temperature (fixing temperature) at the center of the fixing heater 203 in the longitudinal direction. A thermistor is used as the element of the temperature detection sensor. The temperature detection portion 211 outputs an electrical signal corresponding to the detected fixing temperature to the heater control portion 406.

The thermostat 212 is a temperature-sensitive switch that shuts off the supply of power to the fixing heater 203 by reversing the bimetal and breaking the contact when the temperature of the fixing heater 203 detected by the temperature detection portion 211 reaches a predetermined target temperature.

The alternating current voltage source 401 supplies alternating current power to the heating members 208*a*, 208*b*, 208*c*, and 208*d*.

The switch 402 is provided between the alternating current voltage source 401, and the power control portions 404*a*, 404*b*, 404*c*, and 404*d*. Under the control of the heater control portion 406, the switch 402 makes and breaks to put the alternating current voltage source 401 and the power control portions 404*a*, 404*b*, 404*c*, and 404*d* in a disconnected or connected state.

The switch 403 is provided between the alternating current voltage source 401 and the fixing heater 203. Under the control of the heater control portion 406, the switch 403 makes and breaks to put the alternating current voltage source 401 and the fixing heater 203 in a disconnected or connected state.

The power control portion 404*a* is provided between the switch 402 and the fixing heater 203. Under the control of the heater control portion 406, the power control portion 404*a* supplies the power current provided from the alternating voltage source 401 via the switch 402 to the fixing heater 203. Further, under the control of the heater control portion 406, the power control portion 404*a* shuts down the supply of the power current supplied from the alternating voltage source 401 via the switch 402 to the fixing heater 203.

The power control portion 404*b* is provided between the switch 402 and the fixing heater 203. Under the control of the heater control portion 406, the power control portion 404*b* supplies the power current provided from the alternating voltage source 401 via the switch 402 to the fixing heater 203. Further, under the control of the heater control portion 406, the power control portion 404*b* shuts down the supply of the power current provided from the alternating voltage source 401 via the switch 402 to the fixing heater 203.

The power control portion 404*c* is provided between the switch 402 and the fixing heater 203. Under the control of the heater control portion 406, the power control portion 404*c* supplies the power current provided from the alternating voltage source 401 via the switch 402 to the fixing heater 203. Further, under the control of the heater control portion 406, the power control portion 404*c* shuts down the supply of the power current provided from the alternating voltage source 401 via the switch 402 to the fixing heater 203.

The power control portion 404*d* is provided between the switch 402 and the fixing heater 203. Under the control of the heater control portion 406, the power control portion 404*d* supplies the power current provided from the alternating voltage source 401 via the switch 402 to the fixing heater 203. Further, under the control of the heater control portion 406, the power control portion 404*d* shuts down the supply of the power current provided from the alternating voltage source 401 via the switch 402 to the fixing heater 203.

The heater control portion 406 turns on the switches 402 and 403 when the operation mode of the image forming apparatus 100 is the printing mode in which the image forming apparatus 100 is in a working state and the standby mode in which the image forming apparatus 100 is a waiting state. The heater control portion 406 controls the operations of the power control portions 404*a*, 404*b*, 404*c*, and 404*d* based on an electric signal input from the temperature detection portion 211. At this time, the heater control portion 406 controls the operations of the power control portions 404*a*, 404*b*, 404*c*, and 404*d* according to the size of the recording material P passing through the image forming apparatus 100 and to the previously stored turn-on pattern.

<Configuration of Fixing Heater>

The configuration of the fixing heater 203 of the fixing device 200 according to the embodiment of the present invention will be described in detail while referring to FIGS. 2 and 3.

Figure 3:
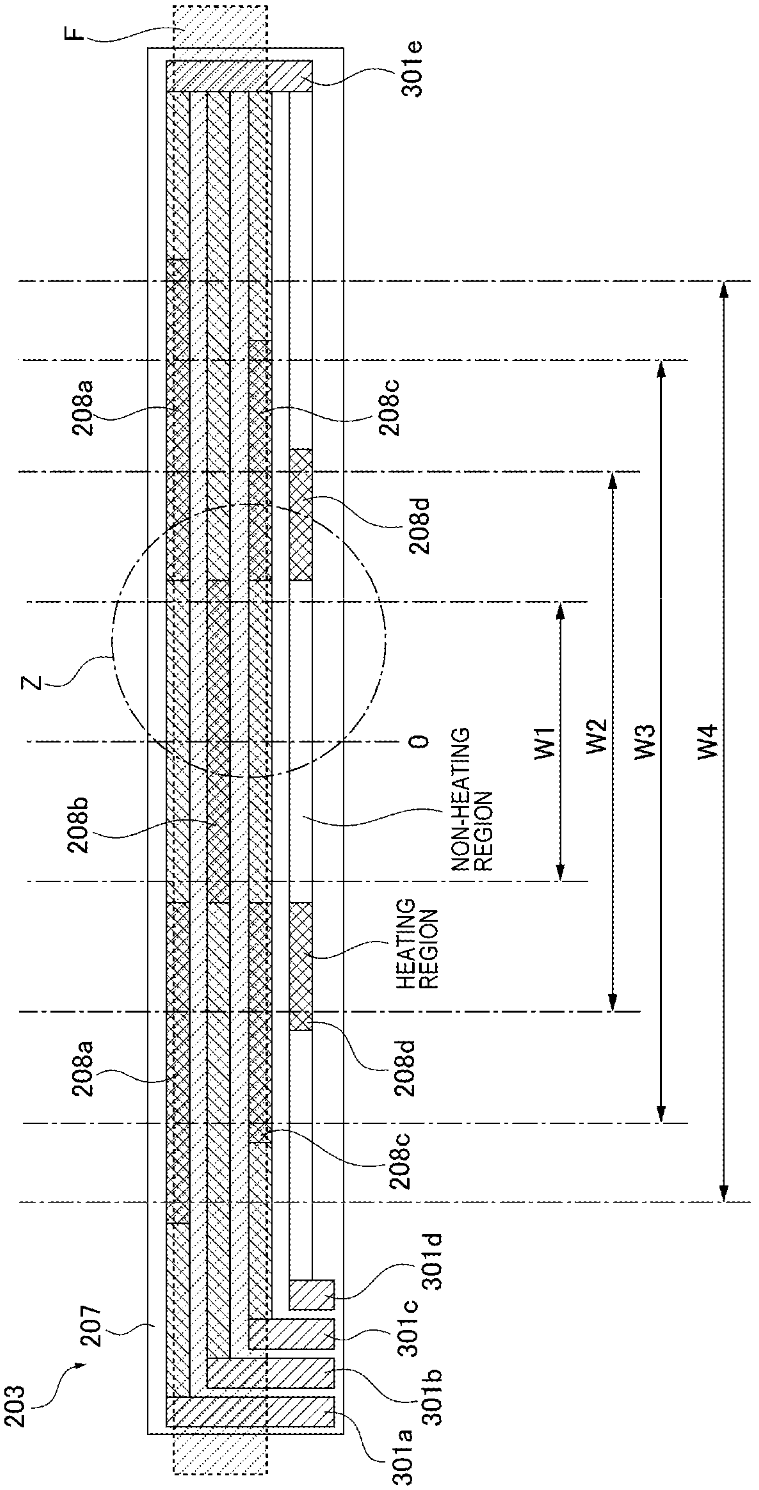
FIG. 3 is a schematic diagram showing a plan view of the configuration of the fixing device according to an embodiment of the present invention.
Figure 4:
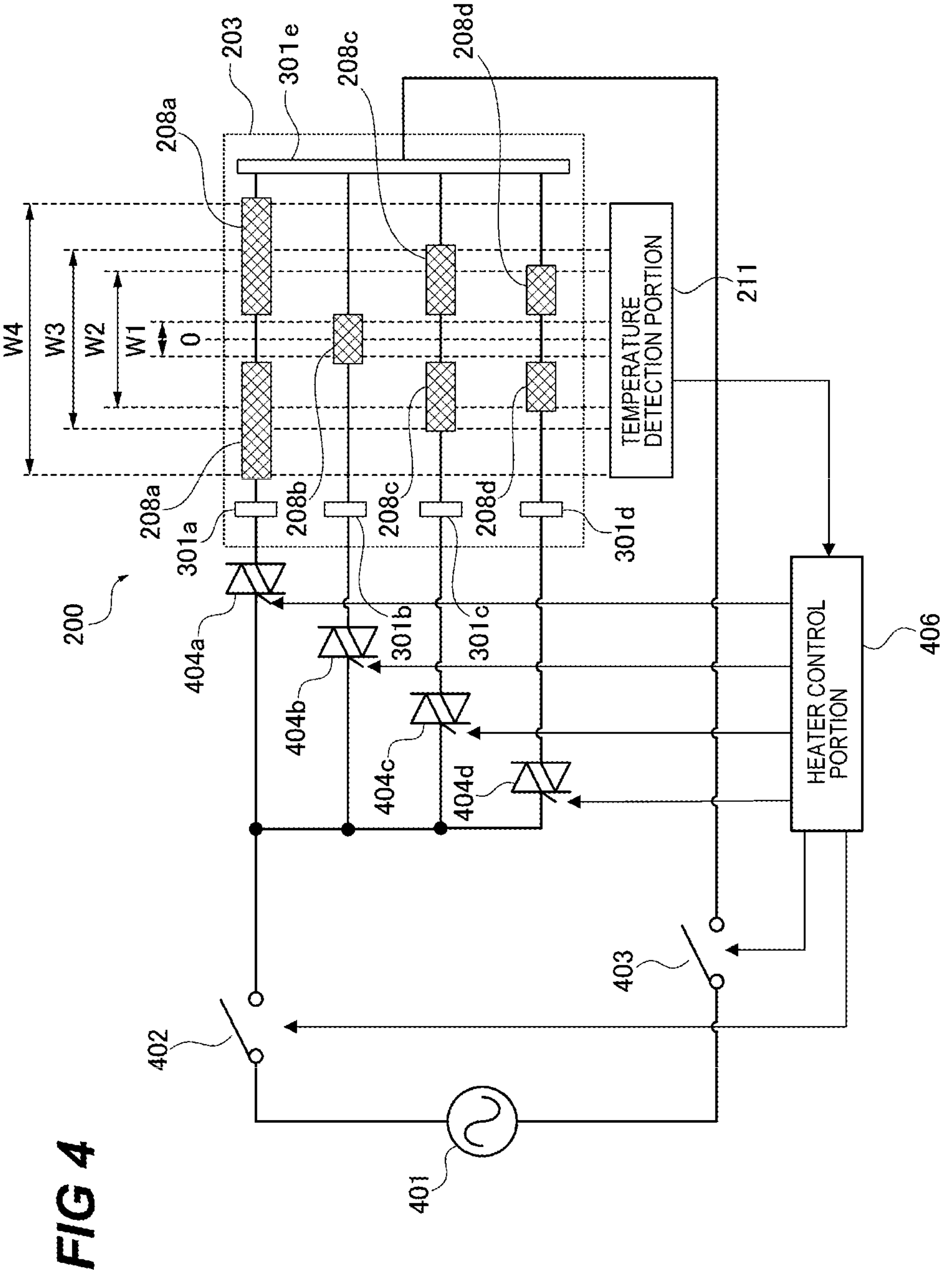
FIG. 4 is a block diagram showing the configuration of the fixing device according to an embodiment of the present invention.

In FIG. 3, the center point in the longitudinal direction of the sheet-passing region through which the recording material P passes is defined as "0".

The fixing heater 203 has the circuit board 207, the heating members 208*a*, 208*b*, 208*c*, and 208*d*, the protective glass 209, the electrodes 301*a*, 301*b*, 301*c*, 301*d*, and 301*e*. In FIG. 2, the heating members 208*a*, 208*b*, 208*c*, and 208*d* are collectively referred to as 208.

The circuit board 207 is formed by the materials having insulation and heat resistance and the materials having a low heat capacitance. The direction perpendicular to the conveying direction (upward direction in FIG. 3) is defined as the longitudinal direction of the circuit board 207. The longitudinal direction of the circuit board 207 is the same direction as the longitudinal direction of the fixing heater 203. The circuit board 207 may be provided with a polyimide layer of about 10 [μm] thickness as a sliding layer. The polyimide layer serves to suppress reduction of the driving torque and abrasion of the inner surface of the fixing belt 206 by decreasing a sliding resistance between the fixing belt 206 and the fixing heater 203. The heating members 208*a*, 208*b*, 208*c*, and 208*d* are provided on the bottom surface of the circuit board 207.

The heating members 208*a*, 208*b*, 208*c*, and 208*d* are printed on one surface of the circuit board 207 and calcined. The heating members 208*a*, 208*b*, 208*c*, and 208*d* are arranged on the circuit board 207 along the widthwise direction of the circuit board 207. The widthwise direction of the circuit board 207 is the same direction as the widthwise direction of the fixing heater 203. A pair of the heating members 208*a* are distanced apart from each other at the center portion in the longitudinal direction and are placed on both end portions in the longitudinal direction. A pair of the heating members 208*c* are distanced apart from each other at the center portion in the longitudinal direction and are placed on both end portions in the longitudinal direction. A pair of the heating members 208*d* are distanced apart from each other at the center portion in the longitudinal direction and are placed on both end portions in the longitudinal direction. One counterpart of the pairs of heating members 208*a*, 208*b*, and 208*c* are respectively connected to the other counterpart by a conductive pattern of the material such as silver (Ag).

The lengths of the heating members 208*a*, 208*b*, 208*c*, and 208*d* in the longitudinal direction are different from each other and are provided on the circuit board 207 to be symmetric in the longitudinal direction with respect to the center point "0". The resistance values and the supplied power of the heating members 208*a*, 208*b*, 208*c*, and 208*d* are different from each other. The lengths of the heating members 208*a*, 208*b*, 208*c*, and 208*d* in the longitudinal direction have been determined according to the widths of the recording materials P.

The heating members 208*a*, 208*b*, and 208*c* as first heating members are disposed inside the fixing nip N and the fixing belt nip F in the widthwise direction of the circuit board 207. The heating members 208*d* as second heating members are disposed outside the fixing belt nip F. The heating members 208*a*, 208*b*, 208*c*, and 208*d* have different heating regions in the longitudinal direction of the circuit board 207. The heating region of the heating member 208*b* includes the center point "0" in the longitudinal direction in the sheet-passing region of the recording material P in the longitudinal direction of the circuit board 207. The heating regions of the heating members 208*d* do not include the center point "0" in the longitudinal direction in the sheet-passing region of the recording material P in the longitudinal direction of the circuit board 207.

The heating members 208*d* are disposed closer to an end portion of the circuit board 207 than the heating members 208*b* and 208*c* in the widthwise direction of the circuit board 207. The heating members 208*d* are disposed outside the fixing nip N in the widthwise direction of the circuit board 207. The heating members 208*d* heat the region different from that of the heating members 208*a* in the longitudinal direction of the circuit board 207. The amount of generating heat per a unit length by the heating members 208*d* is greater than those of the heating members 208*a*, 208*b*, and 208*c*. The configurations of the heating members 208*a*, 208*b*, 208*c*, and 208*d* will be described later in detail.

The protective glace 209 covers the heating members 208*a*, 208*b*, 208*c*, and 208*d* to keep electric insulation for the heating members 208*a*, 208*b*, 208*c*, and 208*d*.

The electrode 301*a* is independent from the electrode 301*b*, 301*c*, and 301*d* and is connected to one end of the one of the pair of the heating members 208*a* in the longitudinal direction via a conductive pattern of the material such as silver (Ag).

The electrode 301*b* is independent from the electrode 301*c*, 301*d*, and 301*a* and is connected to one end of the heating member 208*b* in the longitudinal direction via a conductive pattern of the material such as silver (Ag).

The electrode 301*c* is independent from the electrode 301*d*, 301*a*, and 301*b* and is connected to one end of the one of the pair of the heating members 208*c* in the longitudinal direction via a conductive pattern of the material such as silver (Ag).

The electrode 301*d* is independent from the electrode 301*a*, 301*b*, and 301*c* and is connected to one end of the one of the pair of the heating members 208*d* in the longitudinal direction via a conductive pattern of the material such as silver (Ag).

The electrode 301*e* is connected to one end of the other one of the pair of the heating members 208*a*, the other end of the heating member 208*b*, one end of the other one of the pair of the heating members 208*c*, and one end of the other one of the pair of the heating members 208*d* in the longitudinal direction via a conductive pattern of the material such as silver (Ag).

<Configurations of Heating Members>

The configurations of the heating members 208*a*, 208*b*, 208*c*, and 208*d* of the fixing device 200 according to the embodiment of the present invention will be described in detail.

The material of the heating members 208*d* is different from those of the heating members 208*a*, 208*b*, and 208*c* such that the amount of generating heat by the heating members 208*d* is greater than those of the heating members 208*a*, 208*b*, and 208*c*. The heating members 208*d* are formed of a material selected according to the lengths of the heating members 208*a*, 208*b*, and 208*c* in the longitudinal direction for the length of the heating members 208*d* in the longitudinal direction. For example, when the lengths of the heating members 208*a*, 208*b*, 208*c*, and 208*d* are almost the same as each other, the heating members 208*d* are formed of a material with less resistance than those of the heating members 208*a*, 208*b*, 208*c*.

The heating members 208*d* have a thickness different from those of the heating members 208*a*, 208*b*, and 208*c* such that the amount of generating heat of the heating members 208*d* is greater than those of the heating members 208*b* and 208*c* in the thickness direction of the circuit board 207. The heating members 208*d* have a thickness according to the lengths of the heating members 208*a*, 208*b*, and 208*c* in the longitudinal direction for the length of the heating members 208*d* in the longitudinal direction. For example, when the lengths of the heating members 208*a*, 208*b*, 208*c*, and 208*d* are almost the same as each other, the heating members 208*d* have a thickness greater than those of the heating members 208*a*, 208*b*, 208*c* to reduce the resistance value per a unit length than those of the heating members 208*a*, 208*b*, 208*c*.

The heating members 208*d* have a supply electric energy or a supply power capacity per a unit length different from those of the heating members 208*a*, 208*b*, and 208*c* such that the amount of generating heat of the heating members 208*d* is greater than those of the heating members 208*b* and 208*c*. The supply electric energy is an electric energy necessary for heating the fixing belt 206 to a desired target temperature. The heating members 208*d* have a supply electric energy or a supply power capacity per a unit length according to the lengths of the heating members 208*a*, 208*b* and 208*c* in the longitudinal direction for the length of the heating members 208*d* in the longitudinal direction.

For example, when the heating members 208*d* are longer than the heating members 208*a*, 208*b*, and 208*c* in the longitudinal direction, the supply electric energy per a unit length of the heating members 208*d* is greater than those of the heating members 208*a*, 208*b*, and 208*c*, and the supply power capacity per a unit length of the heating members 208*d* is less than those of the heating members 208*a*, 208*b*, and 208*c*.

At least one of the material, the thickness, the supply electric energy per a unit length of the heating members 208*d* is (are) different from that (those) of the heating members 208*a*, 208*b*, and 208*c*.

<Operation of Fixing Device>

The operation of the fixing device 200 according to the embodiment of the present invention will be described in detail referring to FIGS. 3 to 6.

Figure 6:
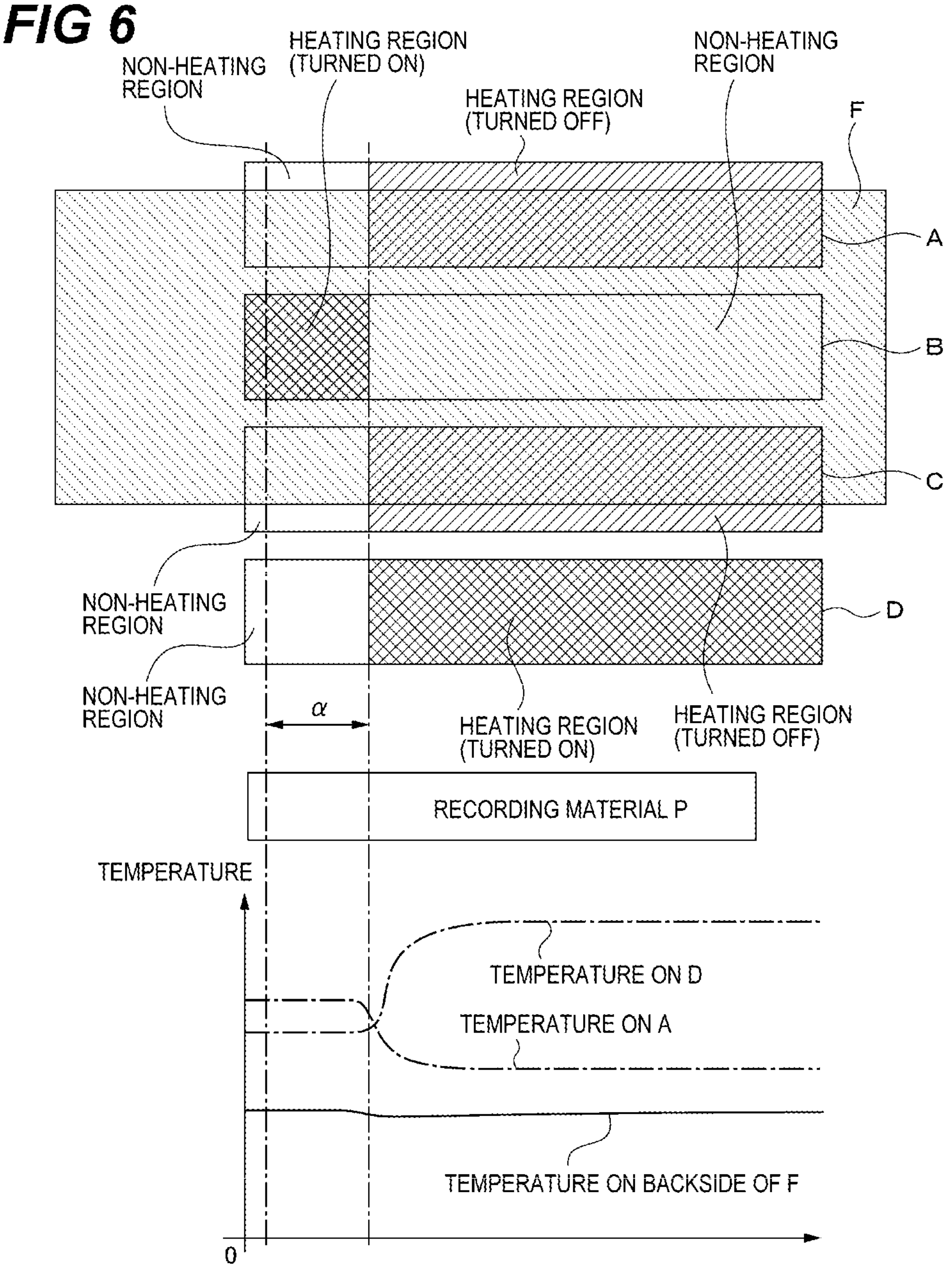
FIG. 6 is a diagram showing the heating members of the fixing device according to an embodiment of the present invention and temperatures on the backside of a fixing belt nip.

In FIG. 6, the line with the heating members 208*a*, the line with the heating member 208*b*, the line with the heating members 208*c*, and the line with the heating members 208*d* are respectively denoted as A, B, C, and D.

When the image forming apparatus 100 is in the printing mode in which the image forming apparatus 100 is in a working state or in the standby mode in which the image forming apparatus 100 is a waiting state, the heater control portion 406 turns on the switches 402 and 403. The heater control portion 406, then, performs the preparation for supplying power to the heating members 208*a*, 208*b*, 208*c*, and 208*d* of the fixing heater 203.

Next, the heater control portion 406 controls the power control portions 404*a*, 404*b*, 404*c*, and 404*d* based on the size of the recording material P passing in the image forming apparatus 100 and the previously stored turn-on pattern. Specifically, the heater control portion 406 controls the duties of the power supplied from the alternating current voltage source 401 to the heating members 208*a*, 208*b*, 208*c*, and 208*d* based on the size of the recording material P passing in the image forming apparatus 100 and the previously stored turn-on pattern.

As a result, the power is suppled from the alternating current voltage source 401 to the heating members 208*a* via switches 402 and 403, the power control portion 404*a*, and the electrodes 301*a* and 301*e*. Further, the power is suppled from the alternating current voltage source 401 to the heating member 208*b* via switches 402 and 403, the power control portion 404*b*, and the electrodes 301*b* and 301*e*. Furthermore, the power is suppled from the alternating current voltage source 401 to the heating members 208*c* via switches 402 and 403, the power control portion 404*c*, and the electrodes 301*c* and 301*e*. Moreover, the power is suppled from the alternating current voltage source 401 to the heating members 208*d* via switches 402 and 403, the power control portion 404*d*, and the electrodes 301*d* and 301*e*.

The heating members 208*a*, 208*b*, 208*c*, and 208*d* are turned on when the power is supplied to these heating members, causing the fixing heater 203 to be heated. At this time, the heater control portion 406 monitors the fixing temperature indicated by the electric signal input from the temperature detection portion 211 and controls the timing of turning-on or turning-off of the heating members 208*a*, 208*b*, 208*c*, and 208*d* based on the monitoring results. Specifically, the heater control portion 406 controls the timing of turning-on or turning-off of the heating members 208*a*, 208*b*, 208*c*, and 208*d* such that the fixing temperature coincides with the previously stored target temperature.

Further, the heater control portion 406 controls the timing of turning-on or turning-off of the heating members 208*a*, 208*b*, 208*c*, and 208*d* based on the width of the passing recording material P in the longitudinal direction. The relationship between the widths of the recording material P and the turn-on timing of the heating members 208*a*, 208*b*, 208*c*, and 208*d* will be described later.

After the temperature of the fixing heater 203 reaches the predetermined target temperature by temperature adjustment, the recording material P which bears an unfixed toner image is introduced to the fixing nip portion N. At the fixing nip portion N, the toner image bearing surface of the recording material P contacts the outer surface of the fixing belt 206. The recording material P is moved together with the fixing belt 206 at the fixing nip portion 206.

Heat generated at the fixing heater 203 is transmitted from the inner surface to the outer surface of the fixing belt 206 via the fixing belt nip F, and then transmitted to the recording material P. In the process of the recording material P being nipped and conveyed at the fixing nip portion N, the heat is applied to the recording material P from the fixing heater 203 via fixing belt 206. As a result, a toner image on the recording material P is melted by the heat from the fixing heater 203 and is fixed to the recording material P.

The recording material P having passed the fixing nip portion N is separated from the fixing belt 206 and conveyed.

Generally, the more the heating member is located away from the fixing belt nip F, the more the transmission of the heat to the backside of fixing belt nip F deteriorates. Namely, the transmission of the heat from a heating member to the backside of the fixing belt nip F is not even between when the heating member with the predetermined amount of generating heat is provided outside the fixing belt nip F or when inside the fixing belt nip F. In this case, temperatures on the backside of the fixing belt nip F of the recording material P along the longitudinal direction are not even, so that enough heat cannot be transmitted to the recording material P, which may cause an image failure.

In contrast, when it is configured that the amount of generating heat of the heating members 208*d* is greater than that of the heating members 208*a*, 208*b*, and 208*c*, the temperatures of the recording material P on the backside of the fixing belt nip F along the longitudinal direction becomes even as shown in FIG. 6 even if the heat transmission from the heating members 208*d* to the fixing belt nip F deteriorates more than that from the heating members 208*a*, 208*b*, and 208*c*. As a result, enough heat can be supplied to the recording material P and stable fixing property can be realized.

In a fixing heater, it is preferable to dispose all the heating members inside the fixing belt nip F. However, it is necessary to independently supply power to each heating member, this leads to difficulty in accommodating multiple electrodes respectively connected to the heating members inside the fixing belt nip F. Widening the fixing belt nip F to cover all the heating members could be considered. However, when the fixing belt nip F is widened, a problem may arise that the sizes of components become larger.

<Width of Recoding Material and Turn-On Timing of Heating Members>

The relationship between the widths of the recording material P and the turn-on timing of the heating members 208*a*, 208*b*, 208*c*, and 208*d* in the fixing device 200 according to the embodiment of the present invention will be described in detail referring to FIGS. 3 to 6.

Figure 5:
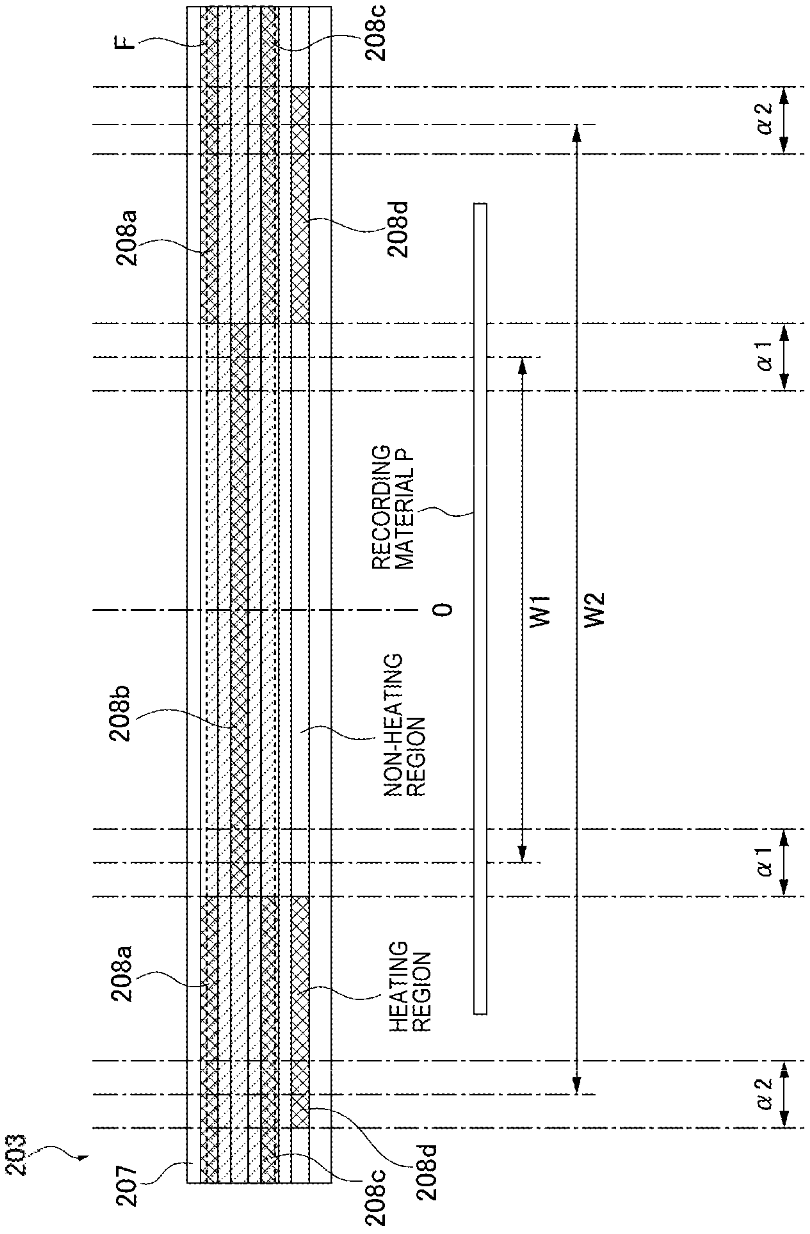
FIG. 5 is a diagram showing the positional relationship between heating members of the fixing device according to an embodiment of the present invention and a recording material.

FIG. 6 is a diagram showing an enlarged portion Z of FIG. 3. FIGS. 5 and 6 describes an example of the case where the width of the recording material P is equal to or greater than the length W1 and less than the length W2.

The threshold values a1 and a2 indicated in FIG. 6 are set with respect to the center point "0". The threshold values a1 and a2 are used for judging whether the heating members 208*a*, 208*c* or 208*d* should be heated or not.

First, the case where the width of the recording material P in the longitudinal direction is W1 will be described. In this case, the width W1 is less than the length of the heating member 208*b*.

When the width of the recording material P has the length W1 in the longitudinal direction, the heater control portion 406 heats the heating member 208*b* by controlling the duty of the supply power such that the power is supplied from the alternating current voltage source 401 to the heating member 208*b*. Further, the heater control portion 406 performs a control such that the power is not supplied from the alternating current voltage source 401 to the heating members 208*a*, 208*c*, and 208*d* or the non-sheet-passing region is controlled to a desired temperature. The heater control portion 406 performs a control such that the non-sheet-passing region is controlled to a desired temperature for example by controlling the duty of the supply power such that the amount of generating heat by the heating members 208*a*, 208*c*, and 208*d* is less than that by the heating member 208*b*.

When the recording material P has the width W1, the heater control portion 406 may be configured to perform a control such that power is supplied to the heating members 208*d* in response to the necessity of suppressing influence due to harmonic flicker.

As a result, a decrease in temperature in the sheet-passing region of the recording material P with the width W1 while suppressing an increase in the non-passing portion of the recording material P with the width W1.

Next, the case where the width of the recording material P in the longitudinal direction is equal to W1 or greater than W1 and less than W2 will be described. This case is shown in FIG. 5. In this case, the width W2 is greater than the length of the heating member 208*b* in the longitudinal direction and less than the sum of the length of the heating member 208*b* in the longitudinal direction and length of the pair of the heating members 208*d* in the longitudinal direction.

When the width of the recording material P in the longitudinal direction is equal to W1 or greater than W1 and less than W2, the heater control portion 406 heats the heating members 208*b* and 208*d* by supplying the power to the heating members 208*b* and 208*d* by controlling the duties of the supply power. In this way, when the width of the recording material P in the longitudinal direction is equal to W1 or greater than W1 and less than W2, the heater control portion 406 also heats the heating members 208*d* in addition to the heating member 208*b* since the recording material P overlaps with the region of the turning-on threshold value a1. The heater control portion 406 performs a control such that the power is not supplied to the heating members 208*a* and 208*c*, or performs a control such that the non-sheet-passing region will have a desired temperature.

When the heater control portion 406 performs a control such that the non-passing portion will have a desired temperature, the heater control portion 406 controls the duty of the supply power such that the amount of generating heat by the heating members 208*a* and 208*c* is less than that by the heating members 208*b* and 208*d*. When heating the heating members 208*d*, the heater control portion 406 controls the supply of power to the heating members 208*d* by the ratio for the duty of the supply of power to the heating members 208*b*, with reference to the duty of the supply of power by which the temperature on a center portion of the heating member 208*b* in the longitudinal direction is controlled to be constant.

As a result, a decrease in temperature in the sheet-passing region of the recording material P with the width being equal to W1 or greater than W1 and less than W2 can be prevented while suppressing an increase in the non-passing portion of the recording material P with the width being equal to W1 or greater than W1 and less than W2.

Next, the case where the width of the recording material P in the longitudinal direction is W2 will be described.

When the recording material P has the width W2 in the longitudinal direction, the heater control portion 406 heats the heating members 208*b* and 208*d* by controlling the duty of the supply power such that the power is supplied to the heating members 208*b* and 208*d*. Further, the heater control portion 406 performs a control such that the power is not supplied to the heating members 208*a* and 208*c*, or the non-sheet-passing region is controlled to a desired temperature.

The heater control portion 406 performs a control such that the non-sheet-passing region is controlled to a desired temperature by for example controlling the duty of the supply power such that the amount of generating heat by the heating members 208*a* and 208*c* is less than that by the heating members 208*b* and 208*d*. When heating the heating members 208*d*, the heater control portion 406 controls the supply of power to the heating members 208*d* by the ratio for the duty of the supply of power to the heating members 208*d* with reference to the duty of the supply of power by which the temperature on a center portion of the heating member 208*b* in the longitudinal direction is controlled to be constant.

As a result, a decrease in temperature in the sheet-passing region of the recording material P with the width W2 can be prevented while suppressing an increase in the non-sheet-passing region of the recording material P with the width W2. Next, the case where the width of the recording material P in the longitudinal direction is equal to W2 or greater than W2 and less than W3 will be described. In this case, the width W3 is greater than the sum of the length of the heating member 208*b* in the longitudinal direction and the length of the pair of the heating members 208*d* in the longitudinal direction, and less than the sum of the length of the heating member 208*b* in the longitudinal direction and the length of the pair of the heating members 208*c* in the longitudinal direction.

When the width of the recording material P in the longitudinal direction is equal to W2 or greater than W2 and less than W3, the heater control portion 406 heats the heating members 208*b* and 208*c* by supplying the power to the heating members 208*b* and 208*c* by controlling the duties of the supply power. In this way, when the width of the recording material P in the longitudinal is equal to W2 or greater than W2 and less than W3, the heater control portion 406 also heats the heating members 208*c* in addition to the heating member 208*b* since the recording material P overlaps with the region of the turning-on threshold value a2. The heater control portion 406 performs a control such that the power is not supplied to the heating members 208*a* and 208*d*, or performs a control such that the non-sheet-passing region will have a desired temperature.

When the heater control portion 406 performs a control such that the non-passing portion will have a desired temperature, for example, the heater control portion 406 controls the duty of the supply power such that the amount of generating heat by the heating members 208*a* is less than that by the heating members 208*b*, and 208*c*. When heating the heating members 208*c*, the heater control portion 406 controls the supply of power to the heating members 208*c* by the ratio for the duty of the supply of power to the heating members 208*b* with reference to the duty of the supply of power by which the temperature on a center portion of the heating member 208*b* in the longitudinal direction is controlled to be constant.

Further, the heater control portion 406 may heat the heating members 208*d* which are within the width W3 in the longitudinal direction if necessary in addition to the heating members 208*b*, and 208*c*.

As a result, a decrease in temperature in the sheet-passing region of the recording material P with the width being equal to W2 or greater than W2 and less than W3 can be prevented while suppressing an increase in the non-sheet-passing region of the recording material P with the width being equal to W2 or greater than W2 and less than W3.

Next, the case where the width of the recording material P in the longitudinal direction is W3 will be described.

When the recording material P has the width W3 in the longitudinal direction, the heater control portion 406 heats the heating members 208*b* and 208*c* by controlling the duty of the supply power such that the power is supplied to the heating members 208*b* and 208*c*. Further, the heater control portion 406 performs a control such that the power is not supplied to the heating members 208*a* and 208, or the non-sheet-passing region is controlled to a desired temperature.

The heater control portion 406 performs a control such that the non-sheet-passing region is controlled to a desired temperature by for example controlling the duty of the supply power such that the amount of generating heat by the heating members 208*a* is less than that by the heating members 208*b* and 208*c*. When heating the heating members 208*c*, the heater control portion 406 controls the supply of power to the heating members 208*c* by the ratio for the duty of the supply of power to the heating members 208*c* with reference to the duty of the supply of power by which the temperature on a center portion of the heating member 208*b* in the longitudinal direction is controlled to be constant.

Further, the heater control portion 406 may heat the heating members 208*d* which are within the width W3 in the longitudinal direction if necessary in addition to the heating members 208*b* and 208*c*.

As a result, a decrease in temperature in the sheet-passing region of the recording material P with the width W3 can be prevented while suppressing an increase in the non-sheet-passing region of the recording material P with the width W3.

Next, the case where the width of the recording material P in the longitudinal direction is equal to W3 or greater than W3 and less than W4 will be described. In this case, the width W4 is greater than the sum of the length of the heating member 208*b* in the longitudinal direction and the length of the pair of the heating members 208*c* in the longitudinal direction, and less than the sum of the length of the heating member 208*b* in the longitudinal direction and the length of the pair of the heating members 208*a* in the longitudinal direction.

When the width of the recording material P in the longitudinal direction is equal to W3 or greater than W3 and less than W4, the heater control portion 406 heats the heating members 208*b* and 208*a* by supplying the power to the heating members 208*b* and 208*a* by controlling the duties of the supply power. In this way, when the width of the recording material P in the longitudinal direction is equal to W3 or greater than W3 and less than W4, the heater control portion 406 also heats the heating members 208*a* in addition to the heating member 208*b* since the recording material P overlaps with the region of the turning-on threshold value a2. The heater control portion 406 performs a control such that the power is not supplied to the heating members 208*c* and 208*d*.

When heating the heating members 208*a*, the heater control portion 406 controls the supply of power to the heating members 208*a* by the ratio for the duty of the supply of power to the heating members 208*a* with reference to the duty of the supply of power by which the temperature on a center portion of the heating member 208*b* in the longitudinal direction is controlled to be constant.

Further, the heater control portion 406 may heat the heating members 208*c* and 208*d* which are within the width W4 in the longitudinal direction if necessary in addition to the heating members 208*b* and 208*a*.

As a result, a decrease in temperature in the sheet-passing region of the recording material P with the width being equal to W3 or greater than W3 and less than W4 can be prevented while suppressing an increase in the non-sheet-passing region of the recording material P with the width being equal to W3 or greater than W3 and less than W4.

Next, the case where the width of the recording material P in the longitudinal direction is W4 will be described.

When the width of the recording material P has the length W4 in the longitudinal direction, the heater control portion 406 heats the heating members 208*b* and 208*a* by controlling the duty of the supply power such that the power is supplied to the heating members 208*b* and 208*a*. Further, the heater control portion 406 performs a control such that the power is not supplied to the heating members 208*c* and 208*d*. When heating the heating members 208*a*, the heater control portion 406 controls the supply of power to the heating members 208*a* by the ratio for the duty of the supply of power to the heating members 208*a* with reference to the duty of the supply of power by which the temperature on a center portion of the heating member 208*b* in the longitudinal direction is controlled to be constant.

Further, the heater control portion 406 may heat the heating members 208*c* and 208*d* which are within the width W4 in the longitudinal direction if necessary in addition to the heating members 208*b* and 208*a*.

As a result, a decrease in temperature in the sheet-passing region of the recording material P with the width being less than W4 can be prevented while suppressing an increase in the non-sheet-passing region of the recording material P with the width W4.

By performing the above-described temperature controls, a decrease in temperature in the sheet-passing region can be prevented while suppressing an increase in temperature in the non-sheet-passing region on the end portions of the recording material P in the longitudinal direction.

In the above embodiment, the duties of the supply power to the heating members 208*a*, 208*c*, and 208*d* are determined by the rates for the duty of the supply power to the heating member 208*b*. However, the embodiment is not limited to this configuration. Temperature detection portions can be respectively provided to the heating members 208*a*, 208*b*, 208*c*, and 208*d* to control duties of the supply power individually based on the results of the temperature detection portions.

The fixing device 200 of the present embodiment has the heating members 208*a*, 208*b*, and 208*c* disposed inside the fixing belt nip F, and the heating members 208*d* disposed outside the fixing belt nip F. The heating regions of the heating members 208*a*, 208*c*, and 208*d* are different from that of the heating member 208*b*. The amount of generating heat per a unit length of the heating members 208*d* is larger that those of the heating members 208*a*, 208*b*, and 208*c*. This enables to suppress the heat transmission efficiency deterioration to the fixing belt 206 from the heating members 208*d* disposed outside the fixing belt nip F out of the heating members 208*a*, 208*b*, 208*c*, and 208*d* disposed in the fixing heater 203.

The present invention is not limited to the above-described embodiment and various alterations are possible without departing from the gist of the present invention.

Specifically, the following change can be possible in the above-describe embodiment. Namely, the lengths of the heating members 208*a*, 208*b*, 208*c*, and 208*d* in the longitudinal direction are different from each other. However, the lengths of a part of or all of the heating members 208*a*, 208*b*, 208*c*, and 208*d* can be made the same.

In the above-describe embodiment, only the heating members 208*d* are disposed outside the fixing belt nip F. However, the configuration can be adopted in which only the heating members 208*a* are disposed outside the fixing belt nip F. In this case, the amount of generating heat per a unit length of the heating members 208*a* is configured to be larger than those of the heating members 208*b*, 208*c*, and 208*d*.

In the above-described embodiment, only the heating members 208*d* are disposed outside the fixing belt nip F.

However, the configuration can be adopted in which the heating members 208*c* and 208*d* are disposed outside the fixing belt nip F. In this case, the amounts of generating heat per a unit length of the heating members 208*c* and 208*d* are configured to be larger than those of the heating members 208*a* and 208*b*.

In the above-described embodiment, the heating members 208*a*, 208*b*, 208*c*, and 208*d* have the lengths in the longitudinal direction as shown in FIG. 3. However, the heating members 208*a*, 208*b*, 208*c*, and 208*d* can be configured to have any lengths in the longitudinal direction.

The above-described embodiment has four lines including respectively the heating members 208*a*, the heating member 208*b*, the heating members 208*c*, and the heating members 208*d*. However, three lines or more than four lines of heating members can be provided instead of four lines.

In the above-described embodiment, the electrodes 301*a*, 301*b*, 301*c*, 301*d*, and 301*e* provided on the end portions of the heating members 208*a*, 208*b*, 208*c*, and 208*d*. However, the electrodes 301*a*, 301*b*, 301*c*, 301*d*, and 301*e* can be provided at any positions.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-081487, filed May 17, 2023, which is hereby incorporated by reference herein in its entirety.

What is claimed is:

1. A fixing device comprising:

a fixing belt that is endless and configured to apply heat to a recording material;

a heater configured to apply heat to the fixing belt, the heater including:

a contact area that contacts with an inner surface of the fixing belt; and a non-contact area that does not contact with the inner surface of the fixing belt;

a pressurizing rotating member configured to contact an outer surface of the fixing belt to form a nip portion between the pressurizing rotating member and the fixing belt, wherein the heater includes:

a circuit board;

a first heating member provided on the circuit board and configured to heat the fixing belt at a first region; and a second heating member provided on the circuit board and configured to heat the fixing belt at a second region different from the first region in a width direction, which is perpendicular to a recording material conveying direction;

a temperature detection portion configured to detect temperature of the heater;

a control unit configured to control power supply for the first heating member and the second heating member based on a detection result of the temperature detection portion, wherein the pressurizing rotating member fixes a toner image to the recording material by applying heat and pressure to the recording material at the nip portion together with the fixing belt, wherein at least one of ends of the first heating member, in the recording material conveying direction, is disposed in the contact area, wherein both ends of the second heating member, in the recording material conveying direction, is disposed in the non-contact area, wherein the control unit, during execution of a first job to fix a toner image onto a recording material whose width dimension perpendicular to the recording material conveying direction is a first predetermined size:

controls the power supplied to the first heating member based on the detection result from the temperature detection unit so that the temperature of the first heating member reaches a predetermined target temperature; and in a state where the temperature of the first heating member is at the predetermined temperature, the power supplied to the first heating member per a unit length of the first heating member is set to a first power, and wherein the control unit, during execution of a second job that fixes a toner image onto a recording material having a width size perpendicular to the recording material conveying direction that is a second predetermined size:

controls the power supplied to the second heating member based on the detection result of the temperature detection unit so that the temperature of the second heating member reaches the predetermined target temperature; and in a state where the temperature of the second heating member is at the predetermined temperature, the power supplied to the second heating member per a unit length of the second heating member is set to a second power larger than the first power.

2. The fixing device according to claim 1, wherein the second heating member is disposed closer to an end portion of the circuit board than the first heating member in the recording material conveying direction.

3. The fixing device according to claim 1, wherein the second heating member is formed from a material different from that of the first heating member.

4. The fixing device according to claim 1, wherein the second heating member has a thickness different from that of the first heating member in a thickness direction of the circuit board.

5. The fixing device according to claim 1, wherein the second heating member provides a greater electric energy than the first heating member.

6. The fixing device according to claim 1, wherein the second heating member provides a greater power capacity than the first heating member.

7. The fixing device according to claim 1, wherein the second heating member has a length in the width direction different from that of the first heating member.

8. The fixing device according to claim 2, wherein in the width direction:

the first region includes a center portion of a region through which the recording material passes, and the second region does not include the center portion of the region through which the recording material passes.

9. The fixing device according to claim 1, wherein:

the heater includes a plurality of heating members, including the first heating member and the second heating member, and the second heating member is disposed at an opposite end portion of the circuit board in the width direction.

10. The fixing device according to claim 1, wherein the contact area is narrower than the nip portion in the recording material conveying direction.

11. The fixing device according to claim 1, wherein a resistance value per a unit length of the second heating member is smaller than a resistance value per the unit length of the first heating member.

12. The fixing device according to claim 1, wherein at least part of the first heating member overlaps the second heating member in the width direction.

13. The fixing device according to claim 1, wherein the temperature detection unit comprises:

a first temperature detection unit for detecting the temperature of the first heating member; and a second temperature detection unit for detecting the temperature of the second heating member.

* * * * *